March 8, 1960  E. D. PALMER  2,927,821
WHEEL AND BALANCING DEVICE
Filed Sept. 24, 1956
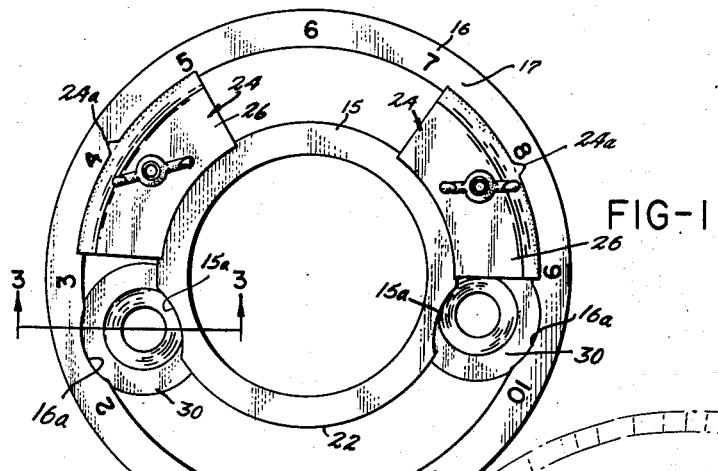
FIG-1
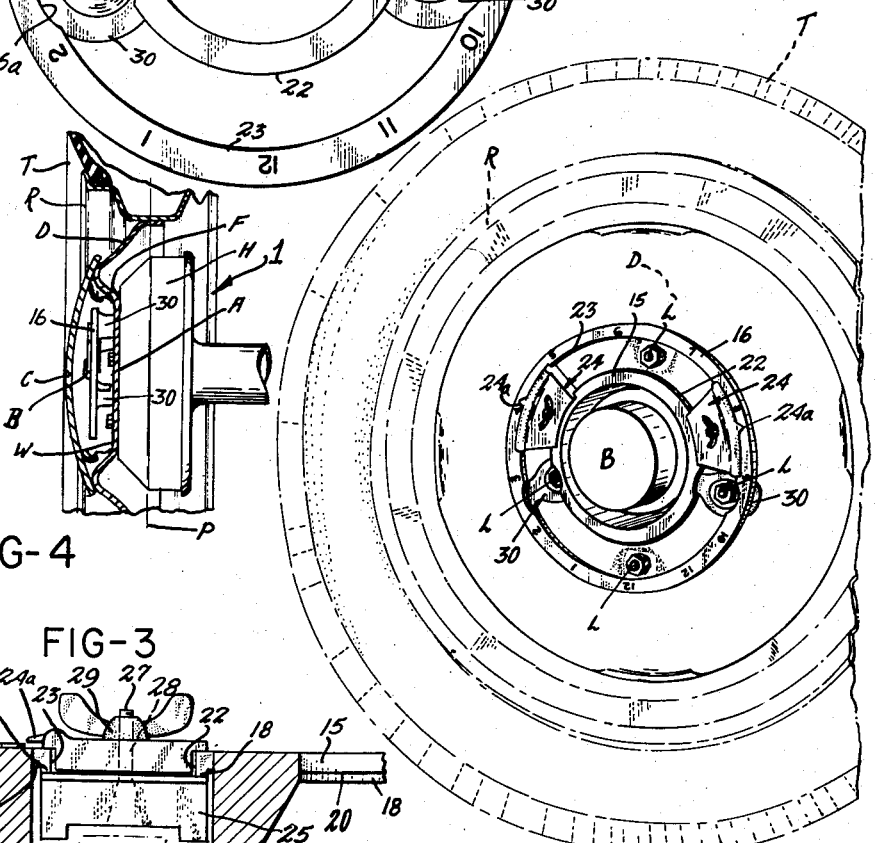
FIG-2
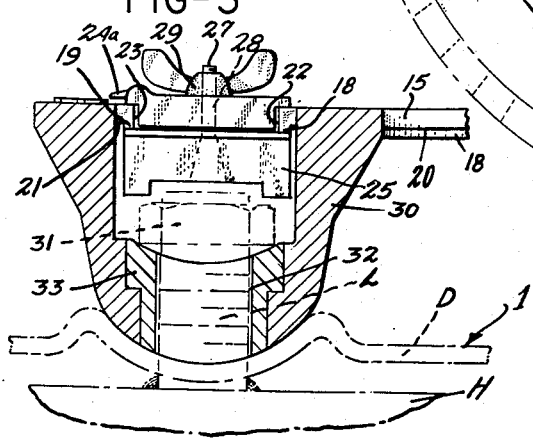
FIG-3
FIG-4
INVENTOR.
Elmer D. Palmer
BY

# United States Patent Office 2,927,821
Patented Mar. 8, 1960

2,927,821

WHEEL AND BALANCING DEVICE

Elmer D. Palmer, Spokane, Wash., assignor of one-half to Ben O. Mohr, Oakesdale, Wash.

Application September 24, 1956, Serial No. 611,612

3 Claims. (Cl. 301—5)

This invention is a vehicle wheel and balancer and more particularly is a balancing device which is secured in spaced parallel concentricity to a vehicle wheel, to the lug bolts of the wheel, and remains as a permanent part of the wheel so that the same device is employed to determine the accurate balance of the wheel and maintain the balance, therefore, making it possible for a vehicle driver to periodically adjust the device to balance the wheels in accordance with the unbalanced condition caused by uneven wear of the tires.

In present day practice it is common to employ a machine to determine the points on a wheel rim at which weight must be applied to bring it into balance, and these weights are applied and become a component part of the wheel. As the tires wear the wheel again becomes out of balance and often times the weight will be disposed in such a place as to increase the throw of the wheel rather than decrease it as is desired by accurately balancing the wheel.

The present invention seeks to overcome the undesirable features of the conventional wheel balancing methods and provide a unit which is adapted to be secured to the lug bolts of a wheel and shaped and anchored preferably so as to be disposed under the hub cap thereof in concentric relation to the hub of the wheel so that periodically the balance of the wheels may be adjusted or corrected as found necessary or desirable.

It is known that balancing devices have been applied to other parts of a vehicle wheel; in some instances to the rim encircling the brake drum. These are employed to balance the wheel alone and not the brake drum and hub housing, which of course is unsatisfactory in the event the brake drum and/or housing are not in equilibrium.

The present invention provides means for balancing the complete wheel, brake drum and hub housing so that it can accurately balance all of the rotating parts secured for rotation to the vehicle spindle or axle.

In the accompanying drawings, I have disclosed a preferred embodiment of the invention, but it will be understood that the drawings are provided for the purpose of illustration only and are not intended to limit the scope of the invention beyond the scope of the appended claims.

In the drawings:

Figure 1 is a plan view of the wheel balancer;

Figure 2 is a perspective view of the wheel balancer secured to the lug bolts of a wheel shown in broken lines;

Figure 3 is a fragmentary cross section on the plane indicated by line 3—3 of Figure 1 and showing the web secured to a lug bolt of a vehicle wheel; and Figure 4 is a reduced vertical cross section taken through a wheel having the present invention attached thereto.

In the drawing the numeral 1 indicates in its entirety a vehicle wheel which includes a tire T, a wheel rim R, the wheel disc D, the brake drum or housing H, to which are secured the lug bolts L. The lug bolts L obviously may take the form of stud bolts extending from the housing H or bolts which may be threaded into female sockets in the housing H.

In Figure 4 of the drawing it will be seen that the wheel disc D is provided with a central well W which has an aperture A at its center to receive the hub housing B and it will also be noted that the median plane P of the complete wheel assembly is disposed substantially midway of the wheel support bearings and in most instances this is spaced inwardly of the outer face F of the brake drum housing. The well of the wheel secures in face to face relationship with the face F so that the weight on the tire T will present a minimum of twisting or wrenching pressure on the lug bolts L under normal support or straight driving of the vehicle.

It will be noted that the wheel balancer includes a pair of spaced inner and outer concentric coplanar rings 15 and 16. The outer ring 16 is provided with indicia such as numerals on its face 17, the purpose of which will be subsequently seen.

As shown in Figure 3, the inner and outer rings 15 and 16 are provided with axially extending annular flanges 18 and 19 on their lower side faces 20 and 21, at the outer and inner annular edge faces 22 and 23 respectively. Weights 24, here shown to be two but which may be one or more than two, comprise upper and lower portions 26 and 25. The lower portion 25 is provided with a stud or bolt 27 which extends upwardly through an aperture 28 in the upper portion 26. The portions 25 and 26 are pressed toward each other by means of a thumb screw 29 cooperating with the treaded end portion of the stud 27.

As seen in Figure 3, the weight portions are of sufficient size to grip or clamp the annular flanges 18 and 19 of the rings 15 and 16 so that they are secured in selective circumferential positions as indicated by the indicia by manually tightening the wing nuts 29 on the stud bolts 27.

The rings 15 and 16 are secured together in concentricity by means of radially extending webs 30 portions of which are offset axially from the common plane of the rings to provide space below the weights 24 for the nuts or bolt heads 31 of the lugs L. This is clearly shown in Figure 3 of the drawing.

It will be noted that the webs 30 are each provided with an aperture 32 disposed and adapted to receive the lugs L to secure the wheel balancer to the wheel. It will also be noted that the webs are provided with steel sleevelike inserts 33 which inserts are employed to prevent undue and unnecessary wear on the webs due to the application and removal of the nuts or bolt heads 31 of the lugs L. Obviously if the material used in the frame is sufficient to withstand such wear and pressures the inserts will not be required. In the product presently manufactured, however, the frame is cast aluminum, therefore, the steel inserts are employed to provide sufficient support to secure the wheel by clamping the webs and the wheel by the lugs L.

It will be noted that the rings 15 and 16 are relieved at 15a and 16a to facilitate the entrance of a wrench head for applying and removing the lugs L. Also, the weights 24 are provided with pointers 24a which assist in balancing the wheel by indicating the location of the weights relative to the indicia such as the numerals on the face 17.

The wheel is balanced by first sliding the two weights to the positions 3 and 9 and by gravity, finding the heavy section of the wheel. The weights are subsequently adjusted and disposed at selected positions until such time as the wheel rolls to a slow stand-still at any position without any roll back, at which time the wheel is in perfect static balance.

In actual practice it has been found that older vehicles, because of slight wear to the cooperating parts of the steering linkage, deviate from their normal direction of travel and require constant correction. The application of the wheel balancers constituting the subject matter of this invention, tends to preclude this tendency to wander, and it is theorized that this is because of the position of the weight close to the hub of the wheel and in parallel spaced relationship to the median plane of the wheel, whereby the weights tend to impart gyroscopic control over the minute variations in the plane of the wheels. This theory is deduced from an exaggerated condition wherein if the weights were disposed in a plane parallel to the median plane of the wheel and, for example, spaced three feet therefrom, a very slight change in the plane of the wheel would cause an exaggerated movement of the weights. Thus it is found that the position of the weights as disclosed, tends to perfect the dynamic as well as the static balance.

As shown in Figure 4, the balancer is disposed in such position that the hub cap C will cover the hub and the balancer and thereby protect it against damage and accidental misplacement of the weights.

Having thus described my invention, I claim:

1. The combination with a vehicle wheel having securing lugs, of a vehicle wheel balancer comprising an annular frame disposed on the outer side of the wheel and adapted to fit under a hub cap thereof; circumferentially spaced webs on the frame receiving the vehicle wheel securing lugs and securing said frame in space parallel concentricity with respect to the wheel; and a plurality of weights releasably secured to said frame for circumferential positioning in accordance with manual selection.

2. The combination with a vehicle wheel having securing lugs and a hub cap, of a vehicle wheel balancer comprising a frame constituting an annular way and disposed on the outer side of said wheel under the hub cap thereof; circumferentially spaced webs on said frame securing said frame concentrically to a wheel by the wheel lugs thereof; a plurality of weights movable to selective circumferential positions on said way; and clamping means for securing said weights in said selective positions.

3. The combination with a vehicle wheel having securing lugs, of a vehicle wheel balancer comprising spaced concentric coplanar rings fixed relative to each other and constituting cooperating ways; a plurality of weights carried and initially slideable on said ways to selective circumferential positions; means securing said weights at said selective circumferential position; circumferentially spaced web means uniting said rings; sleeve-like inserts in said webs receiving said lugs and securing said balancer to said vehicle wheel in concentric spaced parallel relationship thereto.

References Cited in the file of this patent

UNITED STATES PATENTS

| 430,270 | Cook | June 17, 1890 |
| 2,008,933 | Sinclair | July 23, 1935 |
| 2,097,894 | Roche | Nov. 2, 1937 |
| 2,543,447 | Elrod | Feb. 27, 1951 |
| 2,660,475 | Ormsby | Nov. 24, 1953 |
| 2,719,756 | Duke | Oct. 4, 1955 |

FOREIGN PATENTS

| 537,991 | Italy | Jan. 12, 1956 |